United States Patent [19]
Yancy

[11] Patent Number: 5,647,298
[45] Date of Patent: Jul. 15, 1997

[54] ANIMAL FEEDER CHIME

[76] Inventor: William Yancy, 4639 Rivers Ave., North Charleston, S.C. 29405

[21] Appl. No.: 493,363

[22] Filed: Jun. 21, 1995

[51] Int. Cl.⁶ ............................................. A01K 39/014
[52] U.S. Cl. ................................. 119/57.8; 119/69.5
[58] Field of Search ............................... 119/57.8, 57.9, 119/52.2, 52.3, 61, 69.5; D30/128, 129, 133

[56] References Cited

U.S. PATENT DOCUMENTS

| | | | |
|---|---|---|---|
| D. 86,014 | 1/1932 | Diller | D30/128 |
| D. 353,558 | 12/1994 | Scott | D11/141 |
| 2,891,508 | 6/1959 | Bower | 119/57.9 X |
| 3,145,690 | 8/1964 | Bachman | 119/52.3 |
| 3,174,459 | 3/1965 | Browne | 119/57.8 |
| 5,040,491 | 8/1991 | Yancy | 119/57.8 |
| 5,134,968 | 8/1992 | Yancy | 119/57.8 |
| 5,293,835 | 3/1994 | Shagoury | 119/57.9 |

*Primary Examiner*—Robert P. Swiatek
*Assistant Examiner*—Yvonne R. Abbott
*Attorney, Agent, or Firm*—B. Craig Killough

[57] ABSTRACT

An animal feeder chime having a chime which produces musical tones and which are connected to an animal feeder to cause movement and actuation of the chimes as an animal arrives on the feeder. The feeder is mounted on a stake which is structurally designed to sufficiently deflect upon the arrival of the animal on the feeder, to cause movement of the feeder, and actuation of the chime.

3 Claims, 2 Drawing Sheets

ANIMAL FEEDER CHIME

FIELD OF THE INVENTION

This invention relates to chimes, such as wind chimes, and animal feeders.

BACKGROUND OF THE INVENTION

Wind chimes are devices which are normally hung or suspended, usually outdoors, and which produce musical tones as the device is moved about by the wind. Generally, a striker is connected to a clapper, and as the clapper is moved about by the wind, it causes the striker to be blown into and against chimes, producing musical tones.

Wind chimes are hung or suspended so that movement of the chime members is not impeded by other objects. A plurality of chime members, usually four or more, are suspended from the frame. Most commonly, the chimes are hollow metallic tubes which are suspended vertically in a manner which allows movement of the tubes relative to the frame and relative to each other.

The plurality of tubes forms a boundary as determined by their position of suspension from a frame. Generally, the hollow tubes are suspended equidistant from each other, so that, for example, if four tubes are used, the four tubes form the boundary of a square, while five tubes form the boundary of a pentagon, and so on. However, other formations may be used, such as a side by side alignment of the tubes. The chimes are capable of movement relative to each other, with little or no interference in the movement of the chimes caused by the remaining chimes. The striker is suspended, such as from the frame or from the hanging means of the wind chime, and is present within the interior of the boundary formed by the wind tubes, generally in the center of the boundary. The striker is allowed to swing freely so as to strike the plurality of chimes.

The movement of the striker to strike the chimes is influenced by the clapper. The clapper is generally a disk or similar plane which is suspended horizontally to result in maximum exposure to the wind. As the wind contacts and pushes the clapper about, the striker is moved so as to strike the chimes to produce musical tones. The clapper may be decorative in shape or appearance. The device is enhanced by the production of multiple tones. Various wind chimes are known in the art which use hollow tubes of varying dimensions form chimes which produce varying tones. The length or diameter of a hollow tube will affect the musical tone produced, and produce multiple tones.

Yancy, U.S. Pat. No. 5,040,491 shows a bird feeder having chimes attached. Yancy, U.S. Pat. No. 5,134,968, shows a bird feeder which is supported by a rod.

SUMMARY OF THE PRESENT INVENTION

The present invention is a chime which is hung or suspended from an animal feeder, so that actuation of the chime is achieved by the arrival of an animal on the feeder. The chime is comprised of a plurality of tubes or chime members, each of which are hung or suspended from the animal feeder. The animal feeder has a receptacle into which animal food, such as bird food, is placed. The animal feeder is supported from underneath by a stake which is connected to a base, such as by inserting the stake into the ground. The structure of the stake is sufficiently flexible to encourage deflection of the stake upon to the arrival of an animal, such as a bird, on the relatively heavy feeder. As the stake deflects, it moves, causing movement of the bird feeder and causing the chimes to strike and produce a musical sound.

DETAILED DESCRIPTION OF THE PREFERRED EMBODIMENT

Figure 1:
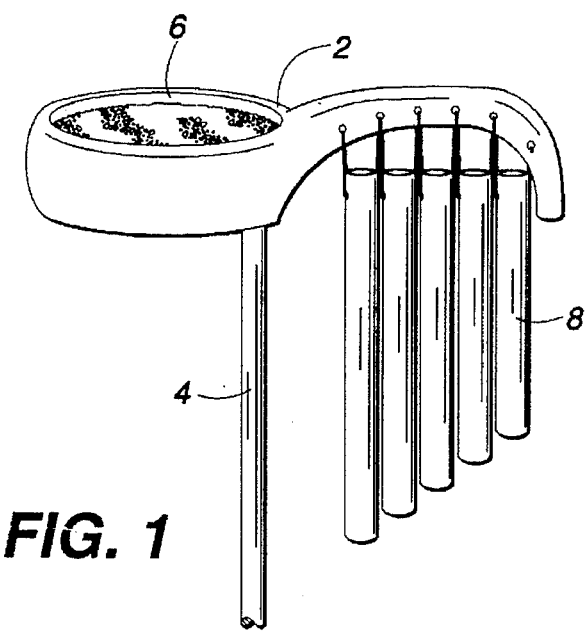
FIG. 1 is a partial perspective view showing one embodiment of the feeder chime.

Referring now to the drawing figures, FIG. 1 shows a first embodiment of a bird feeder chime. A feeder 2 is supported from underneath by a stake 4. The feeder has a receptacle 6, which is similar to a bowl, formed on one end thereof, into which animal food, such as bird food, may be placed. A plurality of tubes 8, which form the chime members, are hung adjacent to each other from the feeder and opposite the receptacle.

Figure 2:
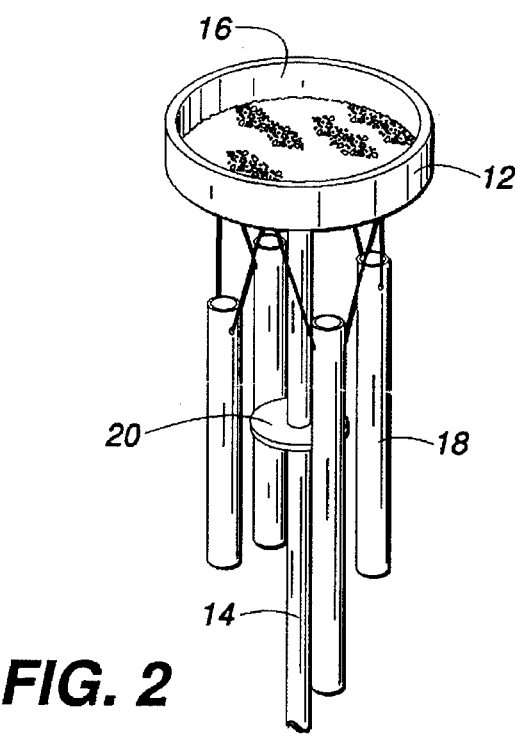
FIG. 2 is a partial perspective view showing another embodiment of the feeder chime.

The feeder shown in FIG. 2 uses a bowl as a receptacle 16. The feeder 12 is supported from underneath by a stake 14. Animal food, such as bird food, is placed in the receptacle. A plurality of tubes 18, which form the chime members, are spaced apart around the perimeter of the feeder and hung adjacent to each other from the feeder. A striker 20 is attached to the stake inside of a boundary which is formed by the tubes. The stake extends through the striker, so that as the stake moves, and the tubes move, contact is achieved between the striker and the tubes to facilitate the production of the musical tones.

Figure 3:
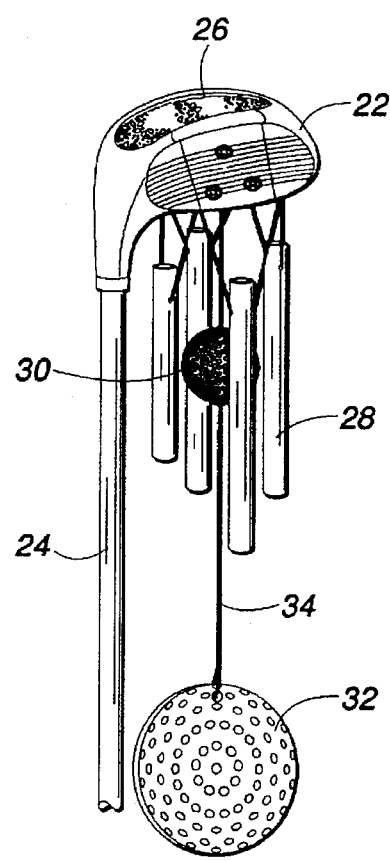
FIG. 3 is a partial perspective view showing yet another embodiment of the feeder chime.

The feeder shown in FIG. 3 uses an inverted golf club shape as the feeder chime. The receptacle 26 of the feeder 22 is a void formed the head of the golf club, with the head of the golf club acting as the feeder. The feeder is supported from underneath by a stake 24, which simulates the shaft of a golf club. Animal food, such as bird food, is placed in the receptacle. A plurality of tubes 28, which form the chime members, are spaced apart and hung adjacent to each other from the feeder. A striker 30 is hung inside of a boundary which is formed by the tubes. A striker in the shape of a golf ball is hung or suspended from a boundary formed by the chimes. A clapper 32 is suspended from the striker.

The objects of the invention are accomplished by the interaction between the feeder, the chime and the stake. The chime is connected to the feeder in a fashion which causes movement of the chime when the feeder is moved, such as when an animal contacts the feeder to feed from the feeder. Movement of the chimes produces musical tones from the chime. The stake supports the feeder, but facilitates movement of the feeder as a force is applied to the feeder.

The stake is formed of a material which will flex. The stake may be formed of a resilient material such as fiberglass, but could also be formed of metal, such as aluminum, or plastic, or wood. The precise structure of the stake is dependent on the material, its length, its cross section, the weight of the feeder to be supported, and the anticipated force applied by the animal as it contacts the feeder to feed. With a bird feeder, the bird will apply a force to the feeder as it lands on the feeder. The stake must deflect, or flex, as a result of the force, so that the feeder moves. The deflection is such that the device oscillates, with the degree of movement decreasing over time until the movement stops. The bird will cause movement of the feeder as the bird departs the feeder. The movement of the device will cause the chimes to sound. The stake may be assembled by connecting two or more sections.

By way of example, and not as a limitation to the invention, a feeder formed of polyester resin and weighing eight (8) ounces is mounted to one end of a fiberglass stake. Four (4) one quarter (¼") inch diameter metal tubes are attached to the feeder by lines to function as a chime. The opposite end of the stake is mounted to a base by inserting the stake into the soil to a sufficient depth to support the feeder having feed in the receptacle. The fiberglass stake may have a length of thirty (30) inches, and a cross sectional diameter of 0.299 inches. A stake having the structure described in this paragraph will have sufficient flexibility to achieve the objects of the invention. As the length of the rod increases, or as the weight of the feeder increases, for example, a rod having a greater cross section may be used to provide additional support, while providing proper flexibility.

Figure 4:
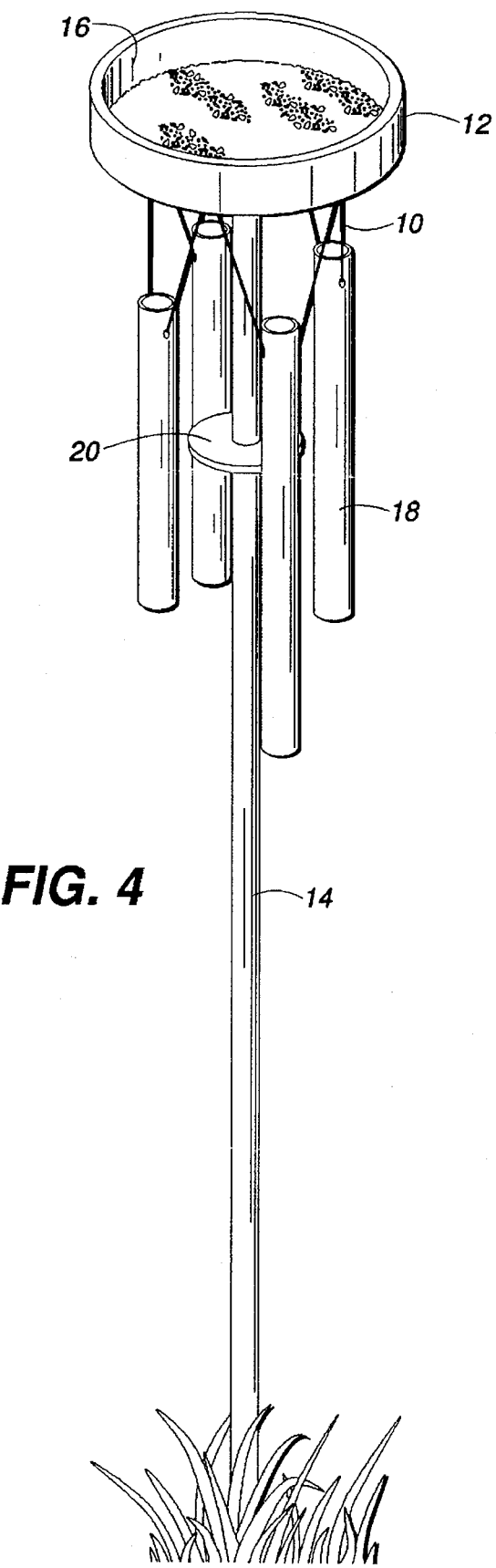
FIG. 4 is a perspective view showing the embodiment of the feeder chime which is shown in FIG. 2.

The stake extends generally vertically. The stake is supported by a base. The base shown in FIG. 4 is the ground, into which the stake is inserted to a sufficient depth to support the device, while maintaining the flexibility of the stake for proper operation of the device. The base could be a platform which supports the stake, or take other similar forms.

As shown in the drawing figures, multiple tubes 8 are incorporated to form the chime. Any number of chime members could be used, however, it is unusual to use fewer than three tubes, or more than six tubes. The chime members need not be tubes.

Most commonly, the chimes are fabricated from hollow, metallic tubing. Tubing of the desired diameter is cut to the desired length. The tube which forms the chimes could be aluminum, copper, steel or other metal, or the tube could be fabricated from other materials which will produce a tone when struck by a striker. As shown in FIG. 1, the hollow tubes may be cut to different lengths to form chimes having different tone characteristics which results from the differing length, diameter, material or cross-sectional dimensions of the individual tubes.

The individual chimes are suspended from the feeder, which acts as a frame. The chimes are suspended from the frame in a manner such that the chimes are allowed some freedom of movement relative to the frame, that is, the chimes are allowed to swing on the line and be moved about. A flexible line 10 made of any suitable material from which objects are normally hung and which will allow movement or swinging of the individual chimes may be used to hang or suspend the tubes from the feeder.

Movement of the striker is influenced by the clapper 32 in the embodiment of FIG. 3. Most commonly, the clapper is a plane or disk which is suspended horizontally for maximum exposure to the wind. The wind strikes the clapper, and as the clapper is moved about, the clapper causes the striker to move about to strike the wind chimes, due to the communication between the clapper and the striker.

The striker is suspended within the boundary formed by the position of the chimes on the frame. The chimes may be positioned equidistantly about the frame, so that as shown in FIG. 2, the four tubes or chime members 18 form the corners of an imaginary square. As shown in FIG. 1, the chimes 8 are placed side by side so as to form a line.

The striker is suspended to allow substantial movement of the striker. Most commonly, a line 34, string, or similar flexible member hangs vertically, with the striker suspended therefrom. The striker may be positioned on the stake as shown in FIG. 2, such as by inserting the stake through the striker.

The clapper is suspended so as to be positioned underneath the striker. The clapper is connected by line 34 which is usually, although not necessarily, flexible, to allow the clapper to extend below the bottom of the chimes in the preferred structure. By suspending the clapper below the bottom of the chimes, maximum exposure to the wind is achieved.

What is claimed is:

1. An animal feeder chime, comprising:
   a. a stake;
   b. a plurality of chimes which is suspended from above an upper portion of said stake and which is spaced apart and arranged to allow movement of said chimes; and
   c. a striker, wherein said stake extends through said striker, and said plurality of chimes surrounds said striker.

2. An animal feeder chime, comprising:
   a. a stake;
   b. a feeder which is attached to said stake;
   c. a plurality of chimes which is suspended and spaced apart and arranged to allow movement of said chimes; and
   d. a striker, wherein said stake extends through said striker, and said plurality of chimes surrounds said striker.

3. An animal feeder chime, comprising:
   a. a feeder;
   b. a plurality of chimes which is suspended from said feeder, wherein said plurality of chimes is spaced apart and arranged to allow movement of said chimes;
   c. a stake which is attached to said feeder; and
   d. a striker, wherein said stake extends through said striker, and said plurality of chimes surrounds said striker.

* * * * *